United States Patent

[11] 3,589,465

| [72] | Inventor | Ray S. Harding<br>Racine, Wis. |
|---|---|---|
| [21] | Appl. No. | 843,630 |
| [22] | Filed | July 22, 1969 |
| [45] | Patented | June 29, 1971 |
| [73] | Assignee | J. I. Case Company<br>Racine, Wis. |

[54] POWER STEERING SYSTEM
4 Claims, 2 Drawing Figs.

[52] U.S. Cl. ................................................. 180/79.2,
60/52
[51] Int. Cl. ................................................. B62d 5/08
[50] Field of Search .......................................... 180/79.2;
60/52 S; 91/426

[56] References Cited
UNITED STATES PATENTS

| 2,893,504 | 7/1959 | Jackson | 180/79.2 |
| 3,246,472 | 4/1966 | Kries | 60/52 (S) |
| 3,400,537 | 9/1968 | Mercier | 60/52 (S) |
| 3,436,915 | 4/1969 | Mercier | 60/52 (S) |
| 3,473,324 | 10/1969 | Mercier | 60/52 (S) |

*Primary Examiner*—Benjamin Hersh
*Assistant Examiner*—Leslie J. Paperner
*Attorney*—Settle, Batchelder and Oltman ABSTRACT: The power steering system incorporating a steering motor, which is operated by a steering pump and a control valve so as to be always energized when steering a neutral course, thus increasing the responsiveness of the system.

INVENTOR.
RAY S. HARDING.
BY
SETTLE, BATCHELDER & OLTMAN.
ATT'YS.

POWER STEERING SYSTEM

This invention relates to improvements in power steering systems.

Because of a driver preference or because of a particular application, it may be desired to increase the responsiveness as well as the stability of a power steering system. To do this often it is necessary either to provide a complicated addition to an existing system or to resort to a redesign which too is complicated.

Accordingly, it is the principal object of the invention, to provide a novel and uncomplicated power steering system in which the responsiveness is substantially increased as well as the stability.

Also contemplated by the invention is unique control valving for obtaining instant responsiveness and improved stability.

Further contemplated by the invention is a power steering system that is particularly suited for use with a constant high pressure source.

Figure 1:
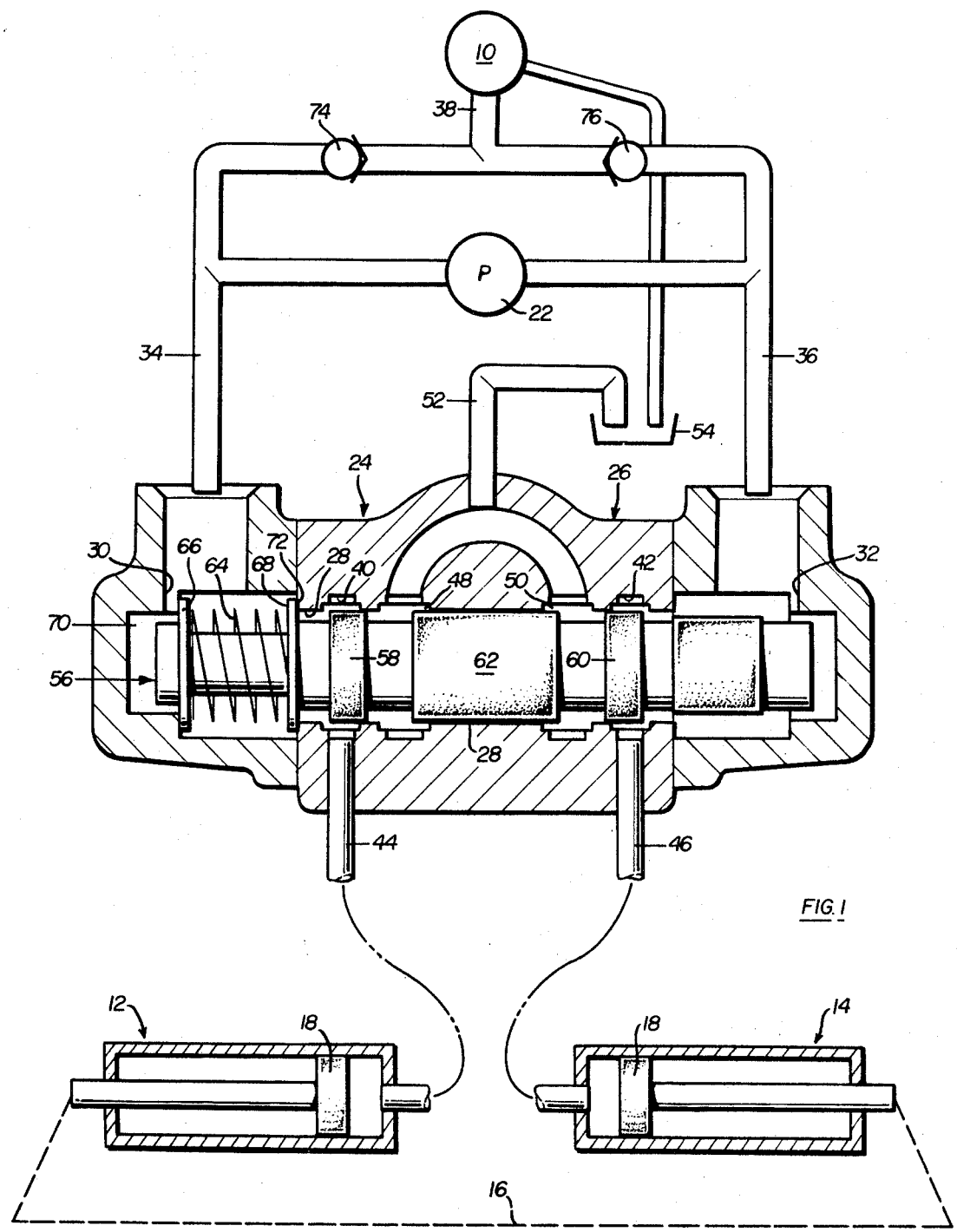
Figure 2:
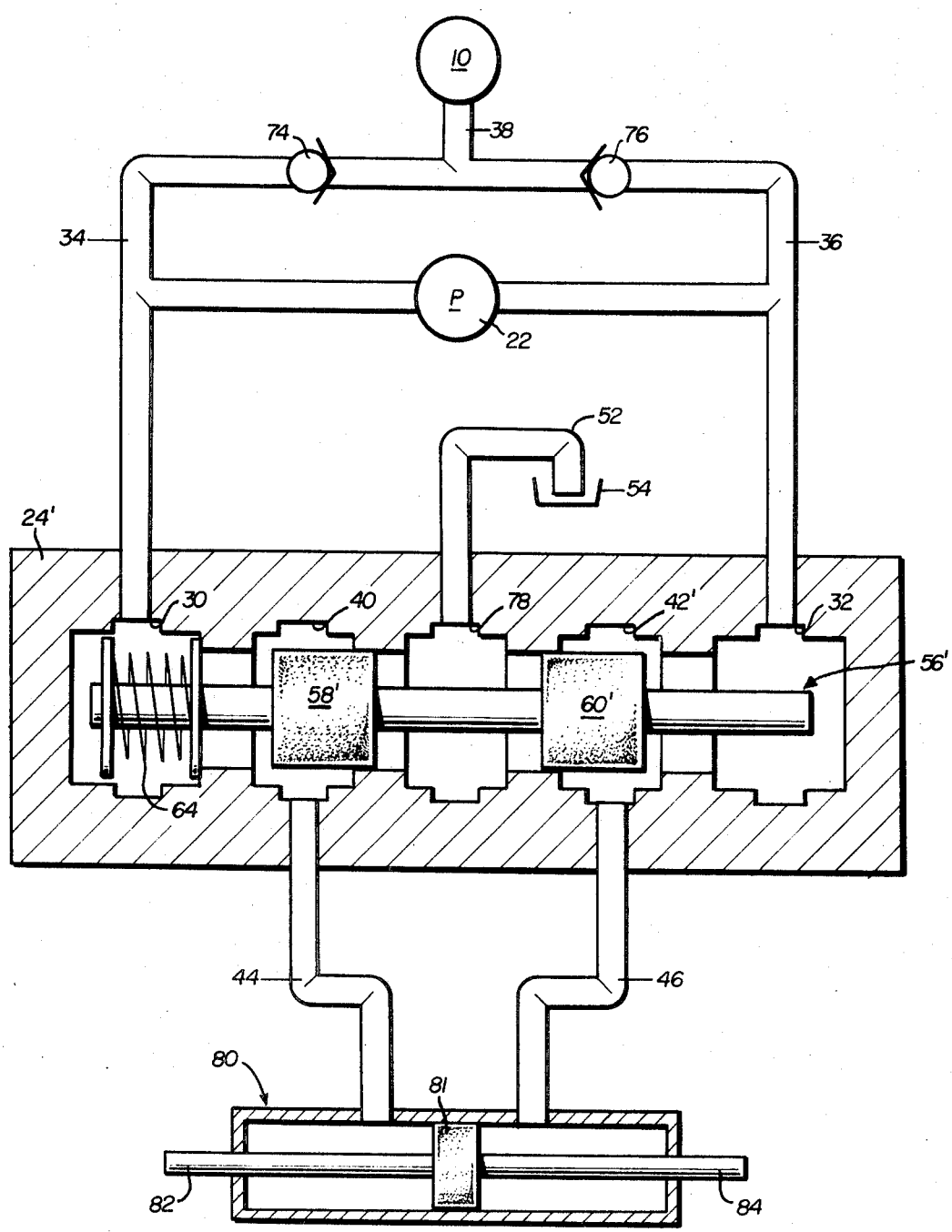

The foregoing and other objects and advantages of the invention will become apparent from the following description, and from the accompanying drawings in which:

FIG. 1 depicts schematically a power steering system incorporating the principles of the invention; and FIG. 2 illustrates schematically a modification of the FIG. 1 power steering system.

Referring now to FIG. 1, the numeral 10 denotes a constant high pressure source, by way of example, this could be a suitable pressure compensated variable displacement pump of a well-known construction. The source 10 provides pressure fluid for operating a pair of steering motors 12 and 14 which through appropriate linkage 16 steers the vehicle wheels (not shown) in the usual way. These steering motors 12 and 14 may be identical and each include a piston 18. A steering pump 22 of conventional construction; e.g., a gear pump is in a well-known way connected to the steering wheel (not shown) so that the steering pump 22 will develop pressure fluid flow in a direction corresponding to that selected and then through the agency of a control valve 24 cause pressure fluid to act on the appropriate steering motor No. 14.

The control valve 24 has a valve body 26 provided with a bore 28. This bore 28 communicates with opposite end control ports 30 and 32 in the valve body 26. These end control ports 30 and 32, in turn, are respectively connected to control conduits 34 and 36. Each control conduit 34 and 36 communicates with the source 10 through a common supply conduit 38. The bore 28 also has a pair of supply ports 40 and 42 respectively in board of the control ports 30 and 32. These supply ports 40 and 42 communicate with the motor 12 and 14 by way of supply conduits 44 and 46 respectively. Between these supply ports 40 and 42 are spaced apart discharge ports 48 and 50 which are each connected to a discharge conduit 52 that returns fluid to a sump 54 for the source 10.

The control valve 24 also includes a valve element 56 which is slidable in the bore 28 in opposite directions from the displayed center position, which will hereinafter be referred to as its neutral setting. The valve element 56 has end control lands 58 and 60 which control fluid communication respectively between the end control ports 30 and 32 and the supply ports 40 and 42. The valve element has an intermediate control land denoted at 62 for controlling communication respectively between the supply ports 40 and 42 and the discharge ports 48 and 50. A centering spring 64 positioned on the left end of the valve element 56, as viewed in FIG. 1, is positioned on the end of the valve element 56 between opposite slidable stops 66 and 68. These stops 66 and 68 engage the valve body 26 respectively at points 70 and 72 such that the valve element 56 is maintained in the mentioned illustrated neutral setting unless moved leftwardly or rightwardly. When so moved the points 70 or 72 and the corresponding stop 66 or 68 together provide a stationary surface against which the centering spring 64 is compressed by the opposite stop 66 or 68.

Briefly describing the operation, it is first assumed that the source 10 is operative and developing a constant pressure. Fluid at this pressure will be supplied by the common conduit 38 respectively through one way check valves 74 and 76 to control conduits 34 and 36 and then to the end control ports 30 and 32. The control valve element 56 will be in its illustrated neutral setting since the total forces on each side will be equal due to the forces, which are determined by the pressure of the areas acted on, and the bias from the centering spring 64. Accordingly, the pressure fluid in the control ports 30 and 32 will pass around the end control lands 58 and 60 and then proceed by way of supply ports 40 and 42 to the supply conduits 44 and 46 and act on the head ends of each of the steering motors 12 and 14. These steering motors 12 and 14 will each be pressurized, therefore hold the steering linkage 16 stationary so that a neutral course is that being followed, will be maintained by the vehicle.

As can be appreciated the steering motors 12 and 14 are continuously exposed to a positive and constant pressure and therefore if it is now decided to change directions, in the usual way the steering wheel is rotated to cause the steering pump 22 to develop an output in a direction corresponding to the direction in which the vehicle is to be steered. Assuming for exemplary purposes that this pressurized fluid flow is towards the end control port 30, there will be a result and imbalance with the pressure on this side of the system, i.e., the control port 30 side, being greater than the pressure on the opposite side, keeping in mind that the check valves 74 and 76 prevent the system from back draining. Therefore, the valve element 56 will be shifted rightwardly to maintain fluid communication with the steering motor 12 while disrupting that to the steering motor 14. This disruption occurs because the control land 60 connects the supply conduit 46 to the sump 54, by way of the supply port 42, the discharge port 50 and the discharge conduit 52. This same increased pressure in urging the valve element 56 to the right, as viewed in FIG. 1, increases the communication between the end control port 30 and the supply port 40. Consequently, the pressure fluid supplied to the steering motor 12 will dominate since the other steering motor 14 is pressure relieved and the vehicle will be turned by the linkage 16 in the corresponding direction.

The valving arrangement is preferably such that the supply port 42 is first cut off from communication with end control port 32 and thereafter the supply port 42 and accordingly the supply conduit 46 is connected to the discharge port 50. This fluid on the side including the control conduit 36 is trapped or what is known as "dead headed" because of the one way check valve 76 which prevents back flow and of course the steering pump 22 is developing flow in the opposite direction.

As soon as the turning of the steering wheel is stopped and accordingly the steering pump 22 ceases operation, the pressure differential across the valve element 56 will diminish and the centering spring 64 will return the valve element 56 to the illustrated neutral setting so that again both steering motors 12 and 14 are supplied with the same pressure and then the vehicle wheels will hold whatever position they are steered. To steer in the opposite direction the cycle of events are reversed with the steering motor 14 being energized and the steering motor 12 being exhausted.

In the FIG. 2 system, the same numerals are used except that those parts which are different are assigned prime numbers. In this FIG. 2 system the control valve is assigned the numeral 24' having a different valve element 56' with no intermediate land and only a single discharge port 78. Also, a different steering motor is illustrated and assigned the numeral 80. The motor 80 has a single piston 8' with steering rods 82 and 84 attached to the opposite ends.

Operationally this FIG. 2 system is substantially the same as the FIG. 1 system. The steering pump 22 when actuated will develop a pressure imbalance, e.g., on the right side as viewed in FIG. 2 so that the valve element 56' is moved leftwardly against the bias from the centering spring 64, in its leftmost position. The land 58' will close the supply port 40', i.e., interrupt communication between the control port 30 and the supplying port 40 and then connect this supply port 40 to the discharge port 78 so as to exhaust the left side of the steering motor 80. Communication between the control port 32 and the supply port 42' is continued so that pressure fluid is supplied to the right side of the steering motor 80 and it will be moved to the left.

When the steering pump 22 is operated to move the valve element 56' to its right most position then the opposite occurs so as to exhaust the right side of the steering motor 80 while continuing the supply of pressure fluid to its left side to effect rightward movement.

As can now be appreciated by this steering system instant response is obtained. Also "drift" or "creep" is virtually eliminated to increase stability. This is all accomplished without resorting to a complex and costly system.

What I claim is:

1. In a power steering system, the combination of fluid pressure operated steering motor means; a source of constant pressure fluid including a pump and a reservoir; a steering pump communicating with the source and selectively operable to provide an increase in pressure fluid flow corresponding to the steering direction selected; and control valve means having a pair of control ports each connected to the source and also connected to the steering pump so that when the steering pump is operated an increased fluid pressure is supplied to one of the control ports and urges the control valve means from a neutral setting thereof to one of a plurality of operative settings thereof corresponding to the steering directions selected, said valve means further having a pair of supply ports connected to the motor means and to said source through said control ports so as to normally supply constant pressure fluid thereto to steer a neutral course when both supply ports are connected to said source, a normally closed off discharge port in said valve means for returning pressure fluid to the reservoir and a bias element for urging the control valve from one of the operative settings in which a corresponding one of the control ports continues to communicate with the associated supply port and the other control port is disconnected from its associated supply port for communication of the supply port with the discharge port to return fluid pressure from said motor means to said reservoir to thereby enable the motor means to be moved in the selected direction from the neutral setting thereof in which both control ports are each connected to a respective one of the supply ports.

2. In a power steering system, the combination of control valve means including a valve element movable from a neutral setting to one of opposite steering directions establishing each of the settings, a pair of control ports, one at opposite ends of the valve element, a pair of supply ports between the control ports, a pair of discharge ports between the supply ports, and a bias element for urging the valve element to the neutral setting; a source of constant pressure fluid connected to the control ports; motor means connected to the supply ports and operative to steer a neutral course when both supply ports are provided with pressure fluid and to steer in corresponding direction when only one of the supply ports is provided with pressure fluid, a steering pump connected to the control ports and selectively operative to direct pressure fluid to one of the control ports corresponding to the steering direction selected so as to move the valve element from the neutral setting in which both supply ports are connected respectively to the adjacent control port to one of the opposite steering directions establishing settings in which one of the supply ports corresponding to selected direction is connected to the adjacent control port and the other supply port is connected to the discharge port so as to cause the motor means to steer in the selected direction.

3. In a power steering system; the combination of control valve means including a valve element movable from a neutral setting to one of opposite steering direction establishing settings, the valve element have opposite end lands and an intermediate land, a pair of control ports one at each of the opposite ends of the valve element, a pair of supply ports between the control ports, a pair of discharge ports between the supply ports, and a bias element for urging the valve element to the neutral setting; a source of constant pressure fluid connected to the control ports; motor means connected to the supply ports and operative to steer a neutral course when the valve element is in the neutral setting with the end lands establishing pressure fluid communication between each control port and adjacent supply port and to steer in one of the opposite directions when the valve element is in the corresponding steering direction establishing setting with one end land establishing pressure fluid communication between one control port and the adjacent supply port corresponding to the selected steering direction and with the other control land establishing pressure fluid communication between the other supply port and the discharge port, and a steering pump connected to the control ports, and selectively operative to increase the pressure of the fluid to one of the control ports determined by the steering direction selected so as to move the valve element to the corresponding steering direction establishing setting.

4. In a power steering system; the combination of a control valve including a valve element having at each end a control land, a pair of control ports one at the end of the valve element, a pair of supply ports between control ports, a discharge port between the supply ports, and a bias element for urging the valve element to the neutral setting; a source of constant pressure fluid connected to the control ports; motor means connected to the supply ports and operative to steer a neutral course when both supply ports are provided with pressure fluid and to steer one of the opposite directions when only one of the supply ports is provided pressure fluid; a steering pump connected to the control ports and selectively operative to direct pressure fluid to one of the control ports corresponding to the steering direction selected so as to move valve element form the neutral setting in which each control land establishes fluid communication between both supply ports and the adjacent control ports so as to cause the motor means to steer the neutral course to the corresponding steering direction establishing settings in which one of the control lands establishes fluid communication between one of the supply ports and the adjacent control port corresponding to the direction selected and the other supply port is connected by the other control land to the discharge port.